(12) United States Patent
Pando Rodriguez et al.

(10) Patent No.: US 10,690,196 B2
(45) Date of Patent: Jun. 23, 2020

(54) SHAFT DECOUPLER FOR ELECTRIC GENERATOR

(71) Applicant: GE AVIATION SYSTEMS LLC, Grand Rapids, MI (US)

(72) Inventors: Luis Javier Pando Rodriguez, Querétaro (MX); Armando Herrera Velázquez, Querétaro (MA); José Israel Zaragoza Hernández, Querétaro (MX); Jorge Alberto Martínez Vargas, Querétaro (MX); Edgar Moises Romero Ramos, Querétaro (MX); Luis Antonio Mendoza Gomez, Querétaro (MX); Pablo David Del Castillo Marcial, Querétaro (MX); Aquiles Tiscareño Macias, Querétaro (MX)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 661 days.

(21) Appl. No.: 15/334,071

(22) Filed: Oct. 25, 2016

(65) Prior Publication Data

US 2018/0112723 A1    Apr. 26, 2018

(51) Int. Cl.
| | |
|---|---|
| *H02K 7/00* | (2006.01) |
| *F16D 27/102* | (2006.01) |
| *F16D 15/00* | (2006.01) |
| *H02K 7/18* | (2006.01) |
| *F02C 7/32* | (2006.01) |
| *H02K 7/10* | (2006.01) |

(52) U.S. Cl.
CPC .............. *F16D 27/102* (2013.01); *F02C 7/32* (2013.01); *F16D 15/00* (2013.01); *H02K 7/10* (2013.01); *H02K 7/1823* (2013.01); *F05D 2220/76* (2013.01); *F05D 2260/4023* (2013.01); *F05D 2260/85* (2013.01); *H02K 7/003* (2013.01); *H02K 2213/06* (2013.01)

(58) Field of Classification Search
CPC ........................................................ F02N 11/04
USPC .......................................................... 74/7 C
See application file for complete search history.

(56) References Cited

U.S. PATENT DOCUMENTS

| | | | | |
|---|---|---|---|---|
| 4,613,761 A * | 9/1986 | Yabunaka | ............... | H02K 7/003 290/36 R |
| 4,685,550 A * | 8/1987 | Metcalf | ................. | F16D 27/118 192/101 |
| 7,728,477 B2 * | 6/2010 | Birdi | ...................... | H02K 7/108 192/54.51 |
| 7,896,147 B2 | 3/2011 | Burke et al. | | |
| 7,946,403 B2 * | 5/2011 | Burke | ..................... | F16D 11/04 192/101 |
| 8,887,889 B2 | 11/2014 | Abousleiman et al. | | |
| 2002/0117860 A1 * | 8/2002 | Man | ........................ | B60K 6/365 290/46 |
| 2009/0178896 A1 | 7/2009 | Turner et al. | | |

(Continued)

*Primary Examiner* — William Kelleher
*Assistant Examiner* — Gregory T Prather
(74) *Attorney, Agent, or Firm* — McGarry Bair PC

(57) ABSTRACT

A decoupler assembly for disengaging a shaft transmitting torque between a rotatory engine and an electric generator. The decoupler assembly includes an output shaft, input shaft wherein the output shaft is selectively coupled to the input shaft. Retractable balls are incorporated into the assembly in order to couple and decouple the input shaft from the output shaft.

16 Claims, 7 Drawing Sheets

(56) References Cited

U.S. PATENT DOCUMENTS

2012/0118103 A1  5/2012  Blewett et al.
2016/0134171 A1  5/2016  Davis et al.

* cited by examiner

US 10,690,196 B2

SHAFT DECOUPLER FOR ELECTRIC GENERATOR

BACKGROUND OF THE INVENTION

A driving mechanism, such as a motor or engine, can generate driving motions at a mechanism output, such as at a rotatable output shaft. The output shaft can, for example, provide a rotational kinetic motion to another piece of equipment via a rotatable drive shaft connected to the output shaft. The piece of equipment receiving the rotational kinetic motion can utilize the driving rotational motion as an energy source to operate. In one example configuration, a gas turbine engine, also known as a combustion turbine engine, is a rotary engine that extracts energy from a flow of combusted gases passing through the engine onto a multitude of turbine blades. The gas turbine engine can provide at least a portion of the rotational kinetic motion to rotating equipment, such as an accessory gearbox, where the rotational motion is utilized to power a number of different accessories. The accessories can include generators, starter/generators, permanent magnet alternators (PMA) or permanent magnet generators (PMG), fuel pumps, and hydraulic pumps. In the event of failure of the driving mechanism, it can be desirable to decouple the driving mechanism from the rotating equipment.

BRIEF DESCRIPTION OF THE INVENTION

In one aspect, an electric generator for an engine, comprising a housing, a rotatable shaft journaled within the housing, a rotor mounted onto the rotatable shaft, a stator mounted within the housing, an output shaft that is operably coupled with the rotor, an input shaft configured to be operably coupled to and rotate with the engine. A backdrive decoupler, comprising a coupler housing operably coupled to the output shaft and defining a cavity therein, a carrier located within the cavity and operably coupled with the input shaft, a member located within the cavity, radially outward from the carrier, movable between a first position and a second position and where the member includes a catch, a strike movable between an engaged position and a decoupled position, where the engaged position is where the strike is engaged with the carrier and the member and the decoupled position is where the strike is no longer engaged with the carrier, wherein driving torque is transmitted from the input shaft to the output shaft through the carrier, strike, and the member. And an actuator configured to move the member from the first position to the second position, wherein the actuator moves the member to the second position, wherein a command signal is transmitted and causes the strike to move to the decoupled position thereby uncoupling torque transfer between the output shaft and the input shaft to define a decoupled position where the input shaft is disengaged from the output shaft.

In another aspect, an electric generator for starting an engine, comprising a housing, a rotatable shaft journaled within the housing, a rotor mounted onto the rotatable shaft, a stator mounted within the housing, an output shaft that is operably coupled with the rotor, an input shaft configured to be operably coupled to and rotate with the engine; and a backdrive decoupler, comprising a member including a catch where the member is movable between a first position and a second position, a set of balls movable between an engaged position and a decoupled position, where the engaged position is where the set of balls is engaged with the output shaft and the input shaft and the decoupled position is where the set of balls is retained within the catch such that the set of balls is no longer engaged with the input shaft, wherein driving torque is transmitted from the input shaft to the output shaft through the set of balls, and the member. An actuator configured to move the set of balls from a first position to a second position, wherein the actuator moves the member to the second position when overrunning torque is transmitted and causes the set of balls to move to the decoupled position thereby uncoupling torque transfer between the output shaft and the input shaft to define a decoupled position where the input shaft is disengaged from the output shaft.

In yet another aspect, a decoupler assembly for decoupling an input shaft from an output shaft during backdrive, comprising a carrier located within the cavity and operably coupled with the input shaft, a member located within the cavity, radially outward from the carrier, movable between a first position and a second position and where the member includes a catch, a strike movable between an engaged position and a decoupled position, where the engaged position is where the strike is engaged with the carrier and the member and the decoupled position is where the strike is no longer engaged with the carrier, wherein driving torque is transmitted from the input shaft to the output shaft through the carrier, strike, and the member. An actuator configured to move the member from the first position to the second position, wherein the actuator moves the member to the second position when overrunning torque is transmitted, causing the strike to move away from the carrier and into the decoupled position thereby uncoupling torque transfer between the output shaft and the input shaft to define a decoupled position where the input shaft is disengaged from the output shaft.

DETAILED DESCRIPTION OF THE EMBODIMENTS

The present disclosure is related to a driving mechanism generating kinetic motion in the form of a rotating shaft coupled with a piece of rotating equipment. One non-limiting example is coupling an electric generator containing more than one component onto an accessory gear box. The starter has various applications including starting a gas turbine engine and generating electrical power when the gas turbine engine is in operation. While the examples described herein are directed to application of a gas turbine engine and an electric generator, the disclosure can be applied to any implementation of a driving mechanism that generates rotational motion at a driving output and provides the rotational motion to another piece of rotating equipment.

Figure 1:
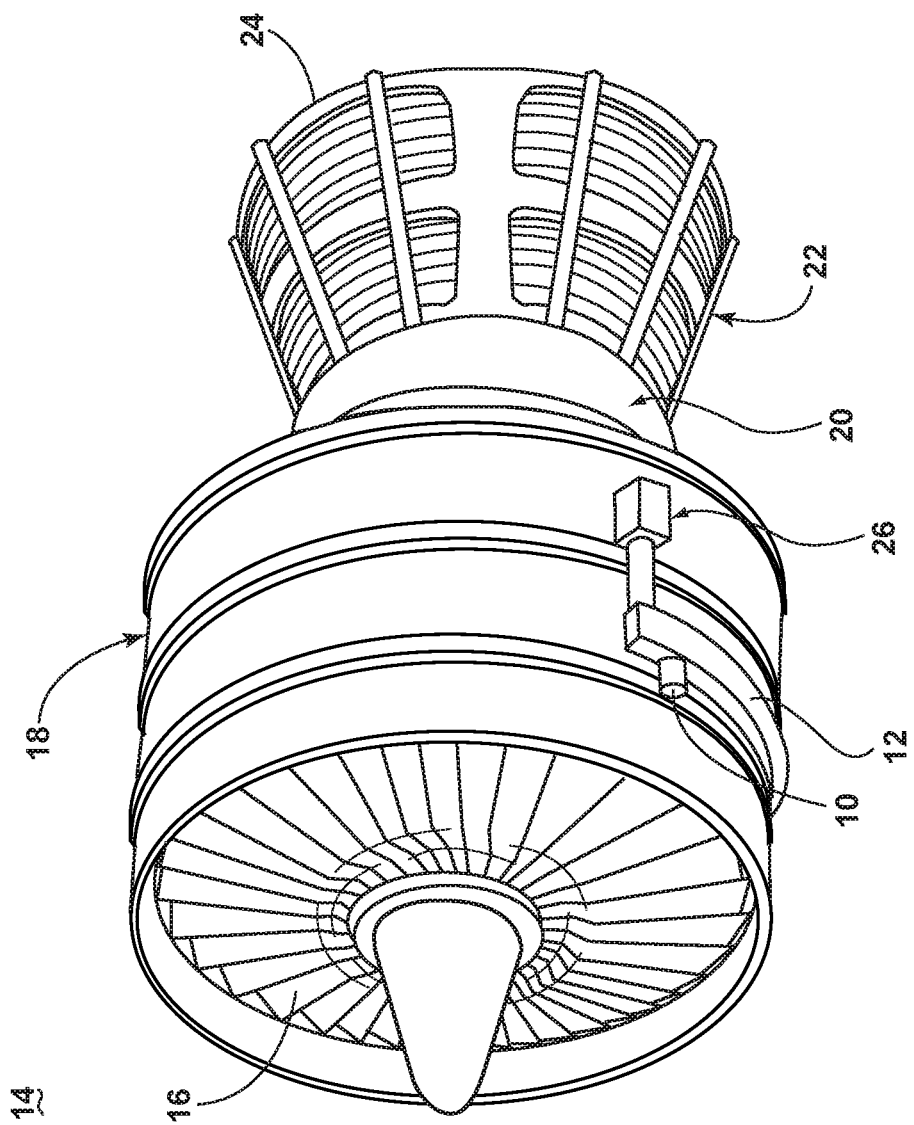
FIG. 1 is a schematic illustration of a gas turbine engine with an accessory gearbox and an electric generator in accordance with various aspects described herein.

Referring to FIG. 1, an electric generator 10 is coupled to an accessory gear box (AGB) 12, also known as a transmission housing, and together are schematically illustrated as being mounted to a gas turbine engine 14. This assembly is commonly referred to as an Integrated Starter/Generator Gearbox (ISGB). The gas turbine engine 14 comprises an air intake with a fan 16 that supplies air to a high pressure compression region 18. The air intake with a fan 16 and the high pressure compression region collectively are known as the 'cold section' of the gas turbine engine upstream of the combustion. The high pressure compression region 18 provides a combustion chamber 20 with high pressure air. In the combustion chamber, the high pressure air is mixed with fuel and combusted. The hot and pressurized combusted gas passes through a high pressure turbine region 22 and a low pressure turbine region 24 before exhausting from the gas turbine engine. As the pressurized gases pass through the high pressure turbine (not shown) of the high pressure turbine region 22 and the low pressure turbine (not shown) of the low pressure turbine region 24, the turbines extract rotational energy from the flow of the gases passing through the gas turbine engine 14. The high pressure turbine of the high pressure turbine region 22 can be coupled to the compression mechanism (not shown) of the high pressure compression region 18 by way of a shaft to power the compression mechanism. The low pressure turbine can be coupled to the fan 16 of the air intake by way of a shaft to power the fan 16.

The gas turbine engine can be a turbofan engine, such as a General Electric GEnx or CF6 series engine, commonly used in modern commercial and military aviation or it could be a variety of other known gas turbine engines such as a turboprop or turboshaft. The gas turbine engine can also have an afterburner that burns an additional amount of fuel downstream of the low pressure turbine region 24 to increase the velocity of the exhausted gases, and thereby increasing thrust.

The AGB 12 is coupled to a turbine shaft of the gas turbine engine 14, either to the low pressure or high pressure turbine by way of a mechanical power take-off 26. The mechanical power take off 26 contains multiple gears and means for mechanical coupling of the AGB 12 to the gas turbine engine 14. The electric generator 10 can be mounted on the outside of either the air intake region containing the fan 16 or on the core near the high pressure compression region 18.

Figure 2:
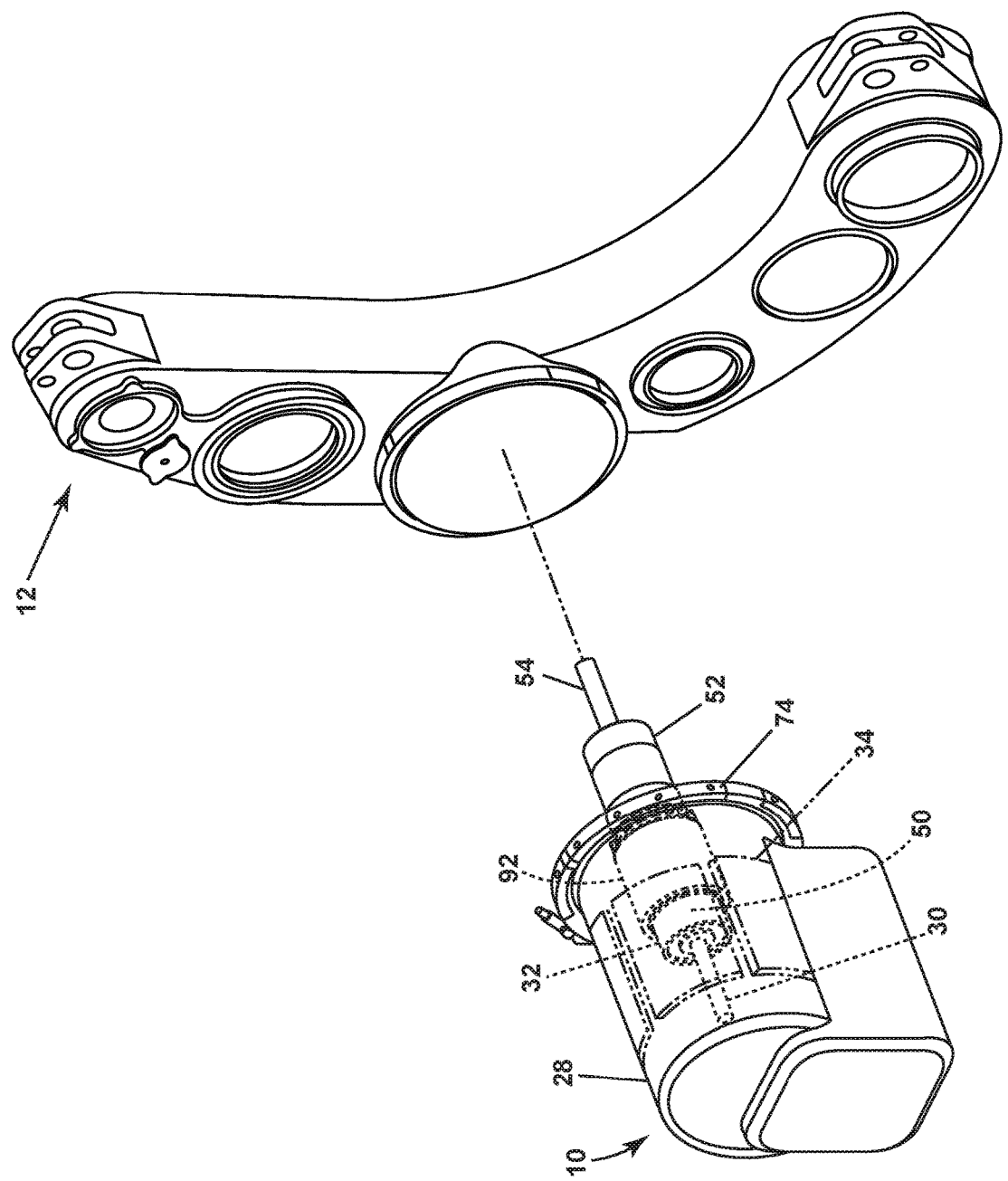
FIG. 2 is an enlarged perspective view of the accessory gear box and the electric generator in accordance with various aspects described herein.

Referring now to FIG. 2, the electric generator 10 and AGB 12 are depicted in perspective view. The AGB 12 and the electric generator 10 can be formed by any known materials and methods, including, but not limited to, die-casting of high strength and lightweight metals such as aluminum, stainless steel, iron, or titanium. The housings for the AGB 12 and electric generator 10 can be formed with a thickness sufficient to provide adequate mechanical rigidity without adding unnecessary weight to AGB 12 and the electric generator 10 and, therefore, the aircraft.

While illustrated as an electric generator the electric generator 10 can be any electric generator know in the art. The electric generator 10 can operate as a generator to provide power for accessories attached to the AGB 12 for example but not limited to a fuel pump, oil pump, or a separate engine starter. It is also contemplated that the electric generator 10 can operate as a motor supplying mechanical output where necessary, for example but not limited to supplying mechanical output torque sufficient to start the engine.

A housing 28 of the electric generator 10 encompasses a rotatable shaft 30 journaled within. A rotor 32 is mounted to the rotatable shaft 30 and a stator 34 is mounted to the housing 28. The rotor 32 terminates in an actuator 50 operably coupled to an output shaft 52. An input shaft 54 extends from within the output shaft 52 and is operably coupled to a portion of the AGB 12.

The rotatable shaft 30 can be constructed by any known materials and methods, including, but not limited to extrusion or machining of high strength metal alloys such as those containing aluminum, iron, nickel, chromium, titanium, tungsten, vanadium, or molybdenum. The diameter of the rotor 32, output shaft 52, and input shaft 54 can be fixed or vary along the length of the rotatable shaft 30. A diameter of the rotatable shaft 30 along with rotor 32 to stator 34 spacings can vary to accommodate different size electric generators.

As described herein, either the AGB 12 or the electric generator 10 can be a driving mechanism for driving the rotation of the rotatable shaft 30. For example, during starting operations, the electric generator 10 via the output shaft 52 can be the driving mechanism for rotation of the rotatable shaft 30. Alternatively, during normal gas turbine engine 14 operation, the AGB 12 can be the driving mechanism via the input shaft 54 for rotation of the rotatable shaft 30. The non-driving mechanism, that is, the equipment being driven by the driving mechanism, can be understood as rotating equipment utilizing the rotational movement of the rotatable shaft 30, for example to generate electricity in the electric generator 10.

Figure 3:
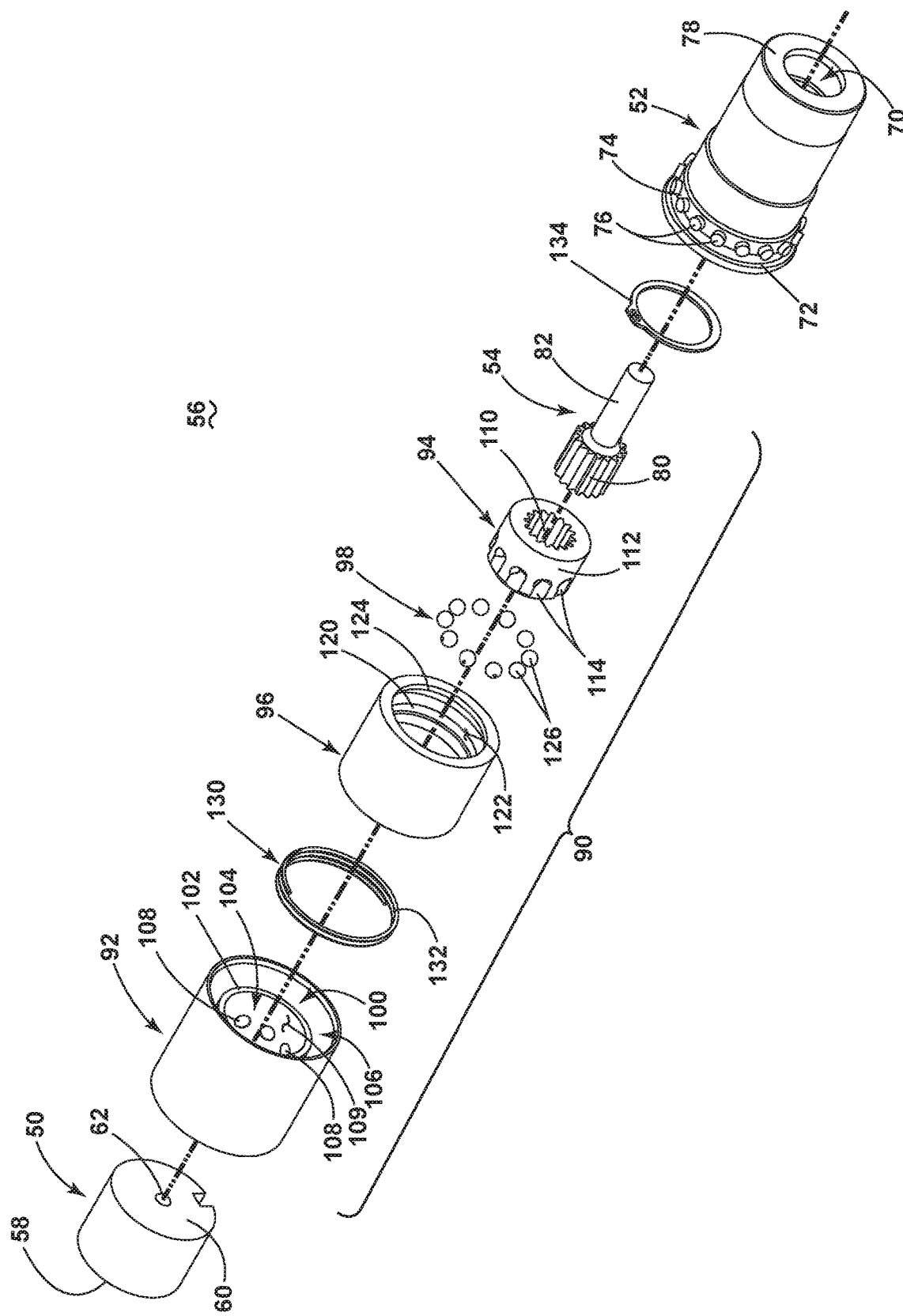
FIG. 3 is an exploded view of a decoupler assembly in accordance with various aspects described herein.

Turning to FIG. 3, an exploded view of a decoupler assembly 56 includes the actuator 50, output shaft 52, and input shaft 54. The actuator 50 is located at a first end 58 of the decoupler assembly 56 closest to the electric generator 10 (FIG. 2). The actuator 50 is an electromagnet formed in a solid annulus 60 with a through core 62.

The output shaft 52 is substantially cylindrical with a hollow interior 70 and a base 72. A diode bridge 74 in an arrangement of four (or more) diodes 76 can circumscribe the base 72. The output shaft 52 can terminate in a face 78 having access to the hollow interior 70.

The input shaft 54 includes an annular geared portion 80 and a shaft portion 82 where the shaft portion 82 is located within the hollow interior 70 of the output shaft 52 and extends through the face 78 of the output shaft 52 to the AGB 12.

The decoupler assembly 56 further includes a backdrive decoupler 90 having a coupler housing 92, a carrier 94, a member 96, and a strike 98.

The coupler housing 92 in turn includes an annular housing defining a cavity 100. An annular inner ring housing 102 separates the cavity 100 into a carrier cavity 104 and a ring cavity 106. The annular inner ring housing 102 includes a plurality of openings 108 provided around a housing surface 109 of the annular inner ring housing 102 and creating a sliding guide for strike 98. The openings 108 can be circular in shape, but are not limited to circular openings and other shaped openings are also contemplated. The actuator 50 has a diameter smaller than the coupler housing 92.

The carrier 94 can define an annular toothed interior 110. An exterior 112 of the carrier 94 can include a set of chambers 114 circumscribing the exterior 112 of the carrier 94. The set of chambers 114 extends partially along the length of the carrier 94.

The member 96 has a diameter smaller than the coupler housing 92 so that it can be located within the cavity 100. More specifically, the ring cavity 106 is radially outward from the carrier 94 when assembled. The member 96 can be an annular ring with an annular catch 120 on an interior surface 122 forming an annular groove 124 inside the member 96. The member 96 has a ferromagnetic body made from, for example but not limited to, iron, nickel, cobalt or the like.

In the exemplary illustration the strike 98 is a set of balls 126 that are arranged to circumscribe the carrier 94. The set of balls 126 can be selectively retractable or moveable between a first position wherein they fit within the annular catch 120 of the member 96 and out of the chambers 114 from carrier 94, and a second position where they are not located within the annular catch 120 and they fit within the chambers 114 from carrier 94. The retractable balls 126 can be made of a ferrous material such that a magnetic force will cause movement of the set of balls 126.

A biasing member 130, for example but not limited to a spring 132 is mounted within the coupler housing 92 in a loaded position axially adjacent the member 96 when the decoupler assembly 56 is assembled. The spring 132 can be any type of suitable spring including a compression spring. It should be understood that spring 132 is an illustrative example of the biasing member 130 and is not meant to be limiting.

Figure 4:
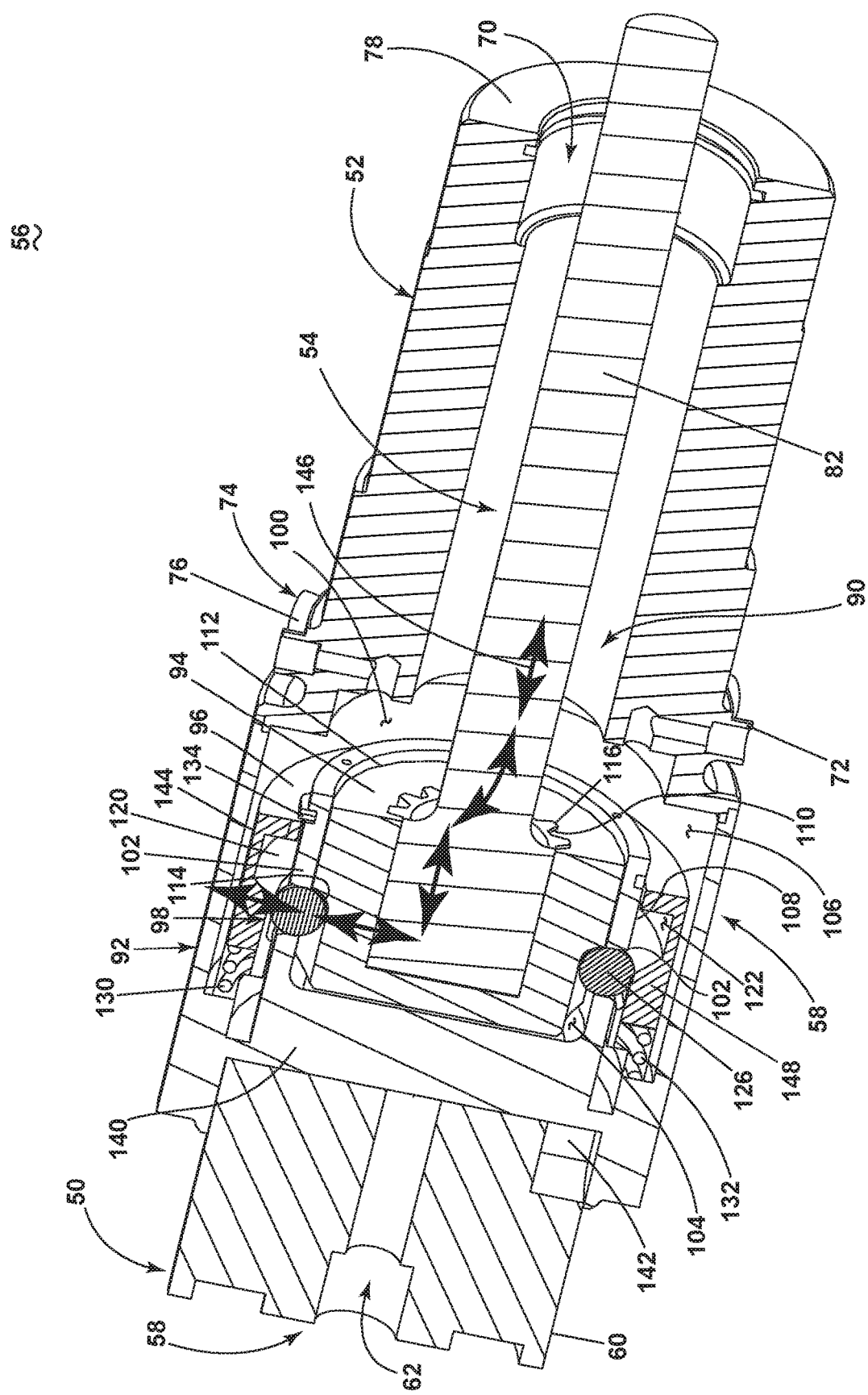
FIG. 4 is a cross-sectional perspective view of the assembled decoupler assembly in a first position in accordance with various aspects described herein.

Turning to FIG. 4, a cross sectional view of the assembled decoupler assembly 56 is illustrated. The coupler housing 92 and output shaft 52 together form a rotatable housing for the decoupler assembly 56. A retainer 134 can be located between the member 96 and the output shaft 52 when assembled.

As can be more clearly seen in the FIG. 4, the coupler housing 92 includes an interior base 140 separating a base section 142 from the cavity 100. The actuator 50 is receivable within and operably coupled to the backdrive decoupler 90 at the base section 142 of the coupler housing 92. The output shaft 52 is operably coupled to the coupler housing 92 at an opposite end of the base section 142. During operation, the actuator 50, coupler housing 92, and output shaft 52 rotate as one shaft with the rotatable shaft 30 (FIG. 2).

The carrier 94 is operably coupled to the input shaft 54 such that during operation they rotate as one shaft. In a first position 144 where the retractable balls 126 are received within the openings 108 of the annular inner ring housing 102. The openings 108 line up with the set of chambers 114 in the carrier 94 such that each ball 126 sits in a chamber 114 in the first position 144. In this position 144, the set of balls 126 operably couple the carrier 94 to the annular inner ring housing 102 and therefore to the coupler housing 92. Each chamber 114 lines up with the openings 108 such that the balls are immovable and provide torque along path 146 when they come in contact with edges of the openings 108. It should be understood that while torque is primarily provided from the input shaft to the output shaft, while in the engaged position, torque can be provided both ways as shown by the arrows along path 146.

Furthermore, in the first position 144, the retainer 134 is operably coupled to the output shaft 52 and configured to abut the member 96 such that a lower step 148 of the annular catch 120 abuts each of the set of selectively retractable balls 126 forcing each ball 126 to remain positioned in each corresponding chamber 114. In the first position 144 a spring force S pushes on the member 96 to maintain the position of the lower step 148.

The annular toothed interior 110 of the carrier 94 is formed to receive the annular geared portion 80 of the input shaft 54 operably coupling the carrier 94 to the input shaft 54.

Under normal starting conditions, a driving torque is transmitted from the output shaft 52 to the input shaft 54 along with the path 146 wherein the rotation of the rotatable shaft 30 causes rotation of the actuator 50, output shaft 52, and the coupler housing 92 which carries the torque to the carrier 94 and through to the input shaft 54.

Under normal generating conditions, a driving torque is transmitted from the input shaft 54 to the output shaft 52 along with the path 146 wherein the rotation of the input shaft 54 causes rotation of the carrier 94, coupler housing 92, output shaft 52, and the actuator 50 which carries the torque through to the rotatable shaft 30.

Figure 5:
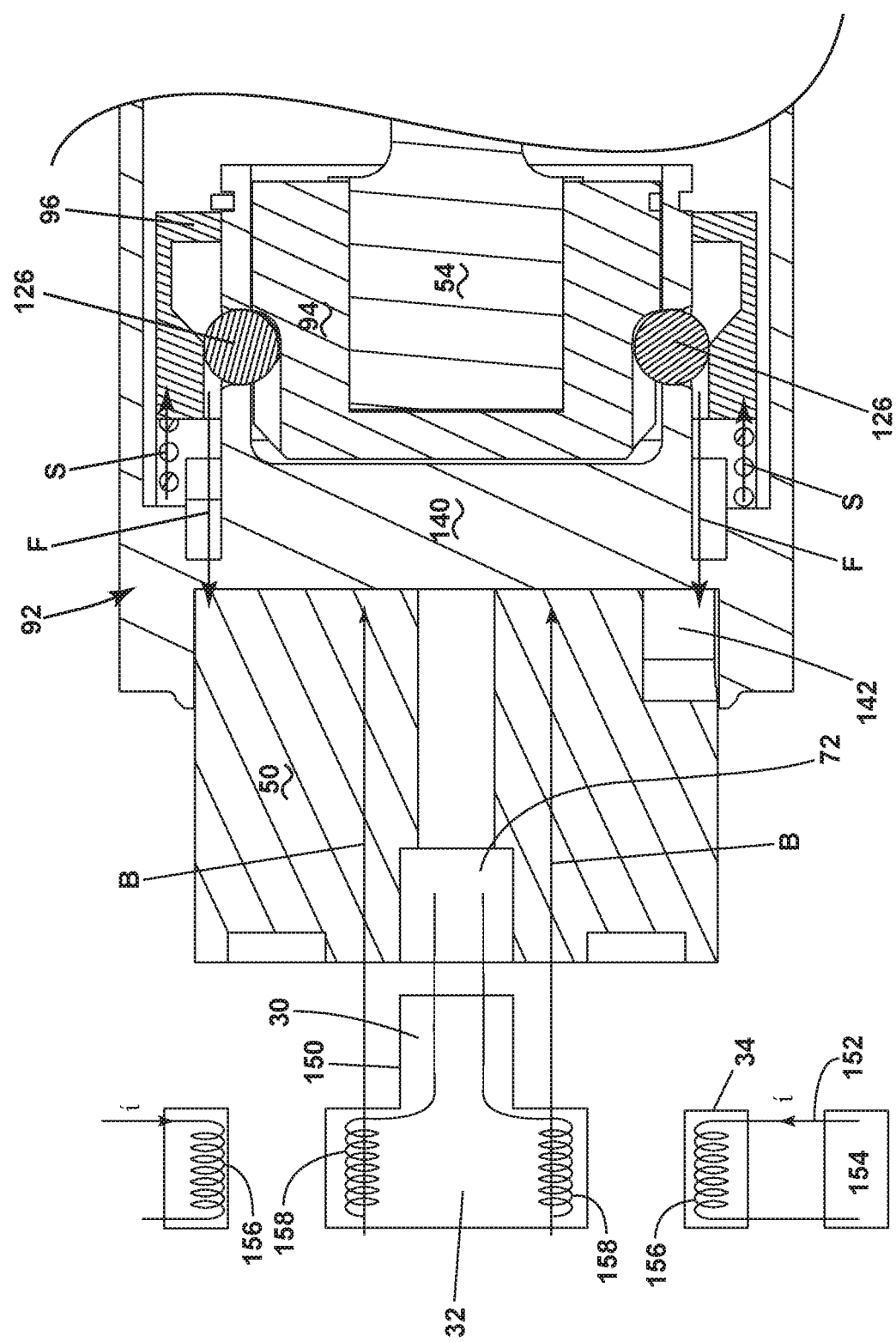
FIG. 5 is a cross-sectional view of the assembled decoupler assembly and a stator and rotor of the electric generator in accordance with various aspects described herein.

Turning to FIG. 5 it can be seen that the through core 62 of the actuator 50 is formed to receive an end 150 of the rotatable shaft 30 such that the rotatable shaft 30 is operably coupled to the actuator 50. In the event of a backdrive where an overrunning torque is being provided from the input shaft 54 to the output shaft 52, or in any other event where the input shaft 54 and the output shaft 52 require decoupling, a command signal 152 is sent by a control module 154 in the electric generator 10. This command signal 152 can be activated using any failure detection mechanism including by way of a non-limiting example, a processor module used to detect vibrations outside of a certain range. It is also contemplated that the processor module can predict a failure and decouple the input shaft from the output shaft 52 before a barely perceptible failure climbs up or an event even occurs.

The command signal 152 can include a current i introduced to a first coil 156 in the stator 34. The current i induces a magnetic field B in a second coil 158 in the rotor 32. The magnetic field B transfers to the electromagnetic material of the actuator 50 and energizes the electromagnet. The member 96 sees the magnetic field B and is pulled towards the actuator 50 by a magnetic force F. The spring force S is less than the magnetic force F, so the magnetic force F overcomes the spring force S accounting for all external forces that may be present.

Figure 6:
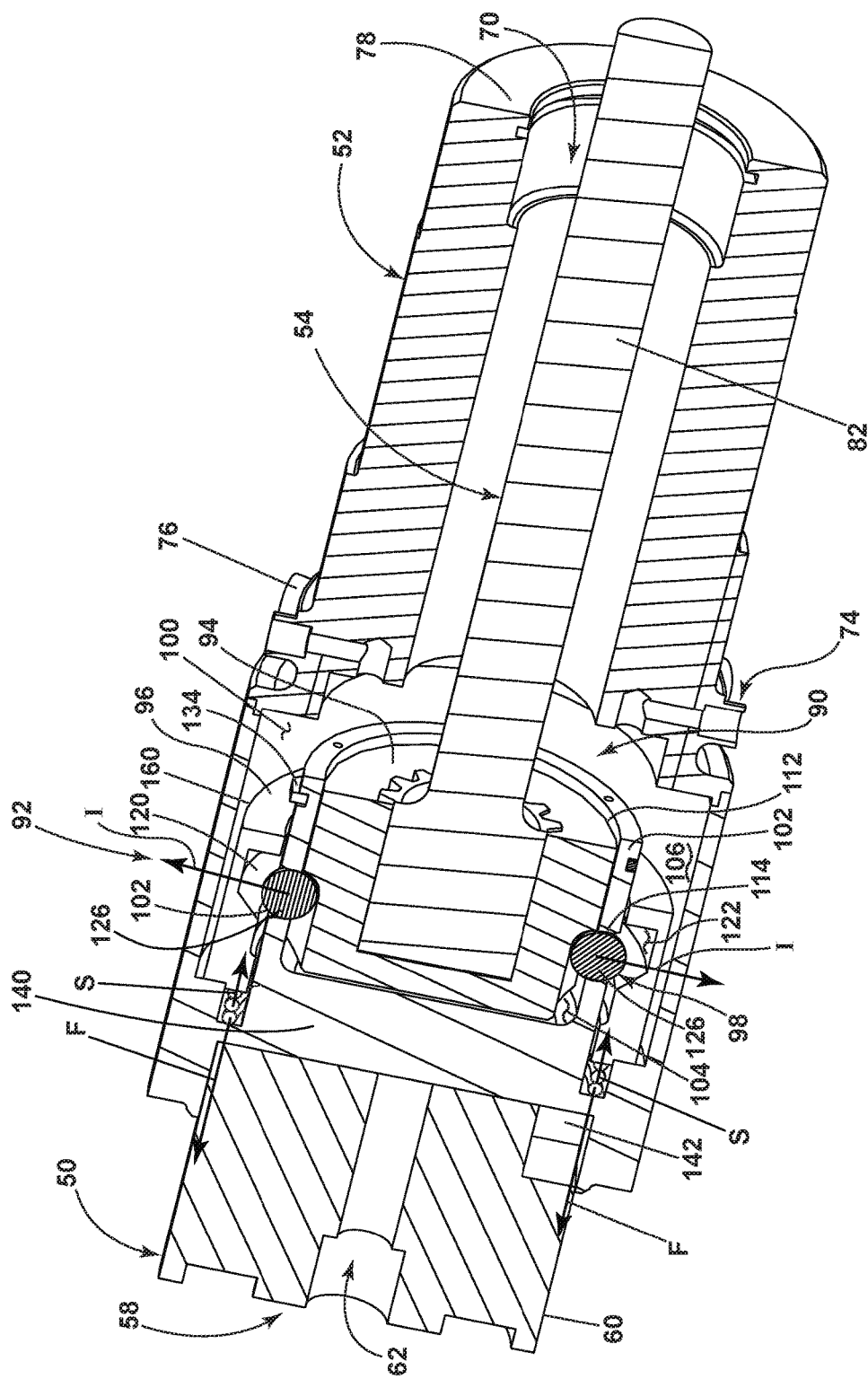
FIG. 6 is a cross-sectional perspective view of the assembled decoupler assembly in a second position in accordance with various aspects described herein.

Turning to FIG. 6, the member 96 is moved axially toward the actuator 50 into a second position 160 due to the magnetic force F and by overcoming the spring force S. The carrier 94 and input shaft 54 continue to rotate which causes the retractable balls 126 to move radially outward due to both inertia I (centrifugal force) and the magnetic force F.

Figure 7:
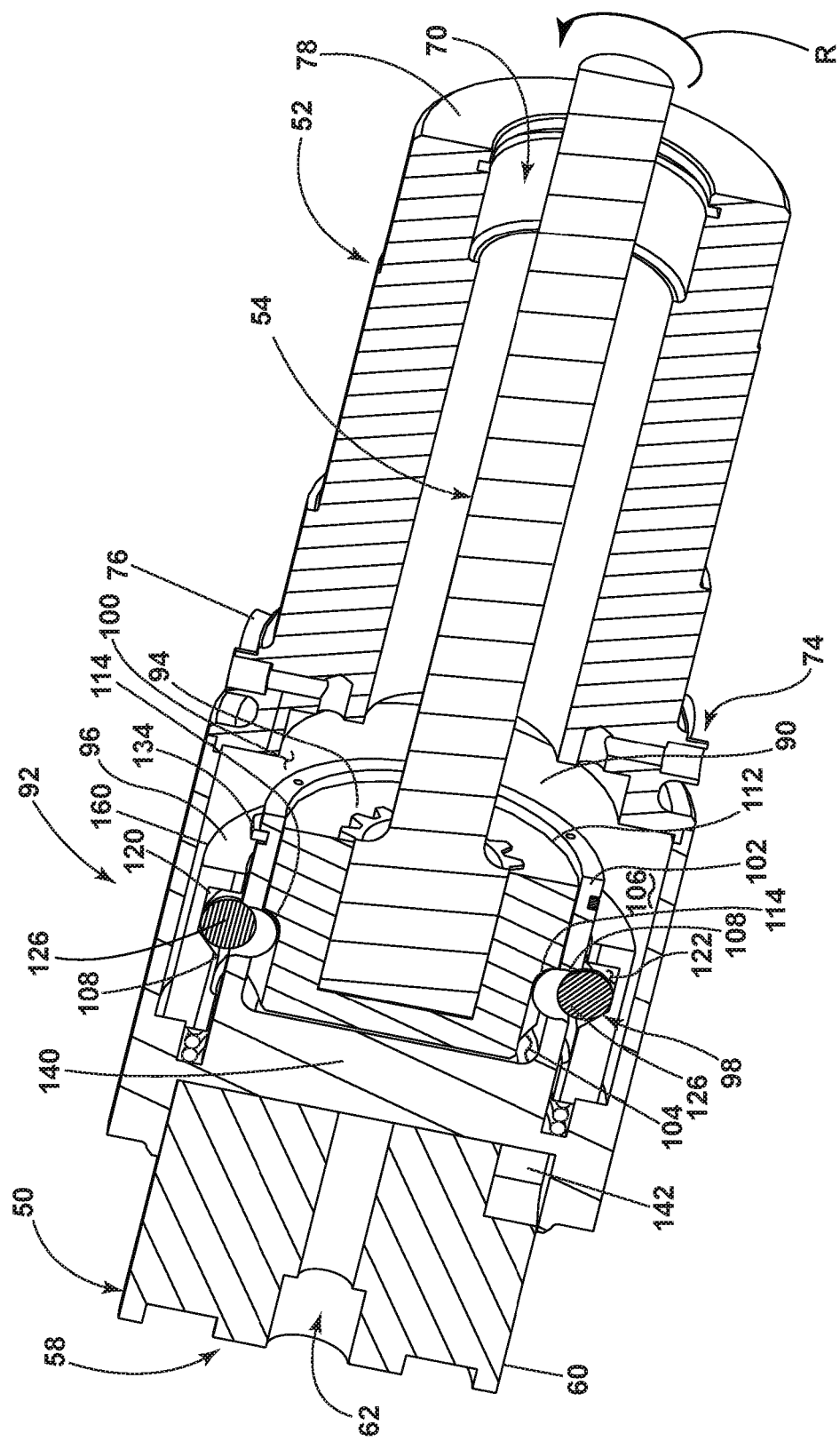
FIG. 7 is another cross-sectional perspective view of the assembled decoupler assembly in a second position in accordance with various aspects described herein.

FIG. 7 illustrates a fully decoupled decoupler assembly 56 where the carrier 94 and input shaft 54 are in a decoupled position are allowed to continue rotating R without overrunning the output shaft 52 and coupler housing 92 and in turn the rotatable shaft 30 of the electric generator 10. As illustrated the balls 126 have moved out of the chambers 114 breaking the path 146 (FIG. 4) such that torque is no longer transmitted. The input shaft 54 is free to continue rotation R while the output shaft 52 and coupler housing 92 cease rotation.

Similar to the command signal 152 used to activate the actuator 50, a second signal can be received to reset the backdrive decoupler 90 where the current i is no longer provided to the coils 136. Without current i there is no longer a magnetic field B and therefore no magnetic force F generated. The spring force S can then push the member 96 back to its original position causing the balls 126 to move back to their chambers 114. The backdrive decoupler 90 can again couple the AGB 12 to the electric generator 10.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

It should be understood that the descriptions herein regarding the decoupler assembly 56 are applicable for any rotatory coupled mechanisms having coupling capabilities using retractable balls 126. The retractable balls 126 provide two operation modes for the decoupler assembly 56. In the first position 144 or engaged operation mode, a spring force maintains the retractable balls 126 in the chambers 114, and in the second position 160 or disengaged operation mode, the actuator 50, an electromagnet, will retract the spring 132 and the member 96 in order to release the retractable balls 126 from their respective chambers 114.

Aircraft generators are coupled to the main engine through the AGB 12. It is a customer safety requirement that, in the event of a generator malfunction that makes any of the rotational equipment within the generator lose its containment mechanism, the generator shall be decoupled from the generator input shaft in order to avoid further spreading of the failure up to any of the serially connected devices located in the AGB 12 or main engine 14.

Advantages to the solution presented herein include that the assembly mechanism can be externally stimulated for a resettable functionality providing in this way a built-in test equipment routine in order to predict system reliability during startup. The number of components required are offered in current state of the art solutions therefore manufacturing of new or improved parts for assembly is not required. The shaft embedded design, where the input shaft 54 is mechanically coupled with the output shaft 52 avoids the need for an extended area assigned for implementation of the design within the electric generator. The rolling balls produce a low amount of contact area between the coupler housing 92 and the carrier 94 resulting in low energy usage for decoupling action when compared to the current state of the art solutions.

Many other possible examples and configurations in addition to those shown in the above figures are contemplated by the present disclosure. Additionally, the design and placement of the various components such as electric generator, AGB, or components thereof can be rearranged such that a number of different in-line configurations could be realized.

The aspects of the present disclosure provide a decoupler for decoupling a torque load coming from the engine to prevent backdriving of the entire electric generator. Benefits associated with this decoupling include reducing the risk of spinning a damaged electric generator which could cause additional damage to the electric generator and/or to the AGB if not decoupled.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new examples, whether or not the new examples are expressly described. Moreover, while "a set of" various elements have been described, it will be understood that "a set" can include any number of the respective elements, including only one element. Combinations or permutations of features described herein are covered by this disclosure.

This written description uses examples to disclose aspects of the invention, including the best mode, and also to enable any person skilled in the art to practice aspects of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric generator for starting an engine, comprising:
   a housing;
   a rotatable shaft journaled within the housing;
   a rotor mounted onto the rotatable shaft;
   a stator mounted within the housing;
   an output shaft that is operably coupled with the rotor;
   an input shaft configured to be operably coupled to and rotate with the engine; and
   a backdrive decoupler, comprising:
   a coupler housing operably coupled to the output shaft and defining a cavity therein;
   a carrier located within the cavity and operably coupled with the input shaft;
   a member located within the cavity, radially outward from the carrier, movable between a first position and a second position and where the member includes a catch;
   a strike movable between an engaged position and a decoupled position, where the engaged position is where the strike is engaged with the carrier and the member and the decoupled position is where the strike is no longer engaged with the carrier, wherein driving torque is transmitted from the input shaft to the output shaft through the carrier, strike, and the member; and
   an actuator configured to move the member from the first position to the second position, wherein the actuator moves the member to the second position when a command signal is transmitted, and causes the strike to move to the decoupled position uncoupling torque transfer between the output shaft and the input shaft to define a decoupled position where the input shaft is disengaged from the output shaft.

2. The electric generator of claim 1 wherein the carrier is mounted about the output shaft and includes a set of chambers configured to retain the strike when the strike is in the engaged position.

3. The electric generator of claim 2 wherein the catch comprise an annular groove in the member.

4. The electric generator of claim 3 wherein the strike comprises a set of selectively retractable balls that is retained in the annular groove in the decoupled position and is retained in the set of chambers in the engaged position.

5. The electric generator of claim 1 wherein the actuator comprises an electromagnet.

6. The electric generator of claim 5 wherein the electromagnet, when energized, is configured to create a force that moves the member to the second position.

7. The electric generator of claim 6 wherein the backdrive decoupler further comprises a biasing member configured to retain the member in the first position.

8. The electric generator of claim 7 wherein the electromagnet, when energized, is configured to create a force greater than a spring force of the biasing member.

9. The electric generator of claim 1 where the command signal is caused by an overrunning torque.

10. The electric generator of claim 1, further comprising a retainer operably coupled to the output shaft and where the retainer is configured to abut the member when the member is in the first position.

11. The electric generator of claim 1 where the command signal is caused by a test routine of the input shaft being decoupled from the output shaft.

12. An electric generator for starting an engine, comprising:
 a housing;
 a rotatable shaft journaled within the housing;
 a rotor mounted onto the rotatable shaft;
 a stator mounted within the housing;
 an output shaft that is operably coupled with the rotor;
 an input shaft configured to be operably coupled to and rotate with the engine; and
 a backdrive decoupler, comprising:
 a member including a catch where the member is movable between a first position and a second position;
 a set of balls movable between an engaged position and a decoupled position, where the engaged position is where the set of balls is engaged with the output shaft and the input shaft and the decoupled position is where the set of balls is retained within the catch such that the set of balls is no longer engaged with the input shaft, wherein driving torque is transmitted from the input shaft to the output shaft through the set of balls, and the member; and
 an actuator configured to move the set of balls from a first position to a second position, wherein the actuator moves the member to the second position when overrunning torque is transmitted and causes the set of balls to move to the decoupled position thereby uncoupling torque transfer between the output shaft and the input shaft to define a decoupled position where the input shaft is disengaged from the output shaft.

13. The electric generator of claim 12 wherein the backdrive decoupler further comprises a carrier mounted about the output shaft and having a set of chambers configured to retain the set of balls when the set of balls are in the engaged position.

14. The electric generator of claim 13 wherein the member is a ring provided radially outward of the carrier and the catch comprise an annular groove in the ring.

15. The electric generator of claim 12 wherein the actuator comprises an electromagnet and the member comprises a magnetic body.

16. The electric generator of claim 15 wherein a generator having a rotor and stator energize the electromagnet and the rotor is located at least partially on the input shaft.

* * * * *